United States Patent [19]

Jackson

[11] Patent Number: 5,423,027
[45] Date of Patent: Jun. 6, 1995

[54] TOOL FOR ERROR DETECTION IN SOFTWARE USING ASPECT SPECIFICATION

[75] Inventor: Daniel N. Jackson, Cambridge, Mass.

[73] Assignee: Massachusetts Institute of Technology, Cambridge, Mass.

[21] Appl. No.: 767,168

[22] Filed: Sep. 27, 1991

[51] Int. Cl.$^6$ ............................................. G06F 11/34
[52] U.S. Cl. ................................................... 395/575
[58] Field of Search .................. 371/19, 20.4, 67.1, 371/15.1, 16.1; 395/575

[56] References Cited

U.S. PATENT DOCUMENTS

| | | | |
|---|---|---|---|
| 4,920,538 | 4/1990 | Chan et al. | 371/19 |
| 4,937,740 | 6/1990 | Agarwal et al. | 371/19 |
| 5,038,348 | 8/1991 | Yoda et al. | 371/19 |
| 5,101,344 | 3/1992 | Bonet et al. | 395/375 |
| 5,124,989 | 6/1992 | Padawer et al. | 371/19 |
| 5,287,488 | 2/1994 | Sakata et al. | 395/500 |

OTHER PUBLICATIONS

Patrick Cousot and Radhia Cousot, "Abstract Interpretation: A Unified Lattice Model For Static Analysis of Programs by Construction or Approximation of Fixpoints", Proc. Conf. on Principles of Prog. Lang., 1977.
Patrick Cousot and Radhia Cousot, "Systematic Design of Program Analysis Frameworks", Proc. Conf. on Principles of Prog. Lang., 1979.
Anne Neirynck, Prakash Panangaden, Alan J. Demers, "Computation of Aliases and Support Sets".
Neil D. Jones and Steven S. Muchnick, "A Flexible Approach to Interprocedural Data Flow Analysis and Programs with Recursive Data Structures", ACM Conf. Princ. Prog. Lang., 1982.
Deborah S. Coutant, "Retargetable High-level Alias Analysis", ACM Conf. Princ. Prog. Lang., 1986.
John Hogg, "Islands: Aliasing Protection in Object-Oriented Languages", OOPSLA, 1991.
David R. Chase, Mark Wegman, F. Kenneth Zadeck, "Analysis of Pointers and Structures", ACM Conf. Prog. Lang. Design and Impl., 1990.
Mark Weiser, "Program Slicing", IEEE Trans. Softw. Eng., vol. SE-10, No. 4, Jul. 1984.
Jeanne Ferrante, Karl J. Ottenstein and Joe D. Warren, "The Program Dependence Graph and Its Use in Optimization", TOPLAS vol. 9, No. 3, Jul. 1987.
Andy Podgurski and Lori A. Clarke, "A Formal Model of Program Dependences and Its Implications for Software Testing, debugging and Maintenance", IEEE Trans. Softw. Engl, vol. 16, No. 9, Sep. 1990.
Neil D. Jones and Steven S. Muchnick, "Flow Analysis and Optimization of LISP-like Structures".
James R. Larus and Paul N. Hlifinger, "Detecting Conflicts Between Structure Accesses", ACM Conf. Prog. Lang. Design and Impl., 1988.
Susan Horwitz, Phil Pfeiffer and Thomas Reps, "Dependency Analysis for Pointer Variables", ACM Conf. Prog. Lang. Design and Impl., 1989.
Cindy Wilson, "Omega-A Data Flow Analysis Tool for the C Programming Language", IEEE Trans. Softw. Engl, vol. SE-11, No. 9, Sep. 1985.
J. C. Huang, "Detection of Data Flow Anomaly Through Program Instrumentation", IEEE Trans. Softw. Eng., vol. SE-5, No. 3, May 1979.
Jean-Francois Bergeretti and Bernard A. Carre, "Information-Flow and Data-Flow Analysis of while-Programs", TOPLAS, vol. 7, No. 1, Jan. 1985.

(List continued on next page.)

*Primary Examiner*—Robert W. Beausoliel, Jr.
*Assistant Examiner*—Phung Chung
*Attorney, Agent, or Firm*—Wolf, Greenfield & Sacks

[57] ABSTRACT

Bugs are identified within a subject program by embellishing the program with specifications that specify relationships between abstract components of objects of the program. The dependency specified by the specifications are compared with the dependencies provided within the code of the subject program to identify any missing dependencies between abstract components in the code. Any missing dependencies in the code point to errors within the subject program.

15 Claims, 7 Drawing Sheets

OTHER PUBLICATIONS

William E. Howden, "Symbolic Testing and the DISSECT Symbolic Evaluation System", IEEE Trans. Softw. Eng, vol. SE-3, No. 4, Jul. 1977.

Sidney L. Hantler and James C. King, "An Introduction to Proving the Correctness of Programs", ACM Comp. Surveys, vol. 8, No. 3, Sep. 1976.

Thomas E. Cheatham Jr., Glenn H. Holloway and Judy A. Townley, "Symbolic Evaluation and the Analysis of Programs", IEEE Trans. Softw. Eng., vol. SE-5, No. 4, Jul. 1979.

Richard C. Waters, "System Validation via Constraint Modeling", A.I. Memo No. 1020, MIT AI Lab, Feb. 1988.

Kurt M. Olender and Leon J. Osterweil, "Cesar: A Static Sequencing Constraint Analyzer", Proc. Third Symp. on Softw. Testing, Analysis and Verification (TAV3), Key West, Florida, Dec. 1989.

William E. Howden, "Validating Programs Without Specifications", Proc. 3rd ACM Symp. on Softw. Testing, Analysis and Verification (TAV3), Key West, Florida, Dec. 1989.

Peter Henderson, "Finite State Modelling in Program Development", Proc. International Conference on Reliable Software, Los Angeles, 1975.

Dewayne E. Perry, "The Inscape Environment", Proc. 11th Int. Conf. Software Engineering, Pittsburgh, Pa., May 1989.

William E. Howden, "Comments Analysis and Programming Errors", IEEE Trans. Softw. Eng., vol. 16, No. 1, Jan. 1990.

Pierre America, Frank van der Linden, "A Parallel Object-Oriented Language with Inheritance and Subtyping", OOPSLA 1990.

Robert E. Strom, "Mechanisms for Compile-time Enforcement of Security", ACM Conf. Princ. Prog. lang., 1983.

Mark Moriconi and Timoth C. Winkler, "Approximate Reasoning about the Semantic Effects of Program Changes", IEEE Trans. Softw. Eng., vol. 16, No. 9, Sep. 1990.

```
      % @ view mutable (t)
131 ~ % @ array ⇒ contents,bounds
132 ~ % @ contents → size
133 ~ % @ bounds ⇒ low,size
134 ~ % @ size → emptiness
135 ~ % @ low
136 ~ % @ emptiness
```

| (array)    | contents,(bounds) |
|------------|-------------------|
| contents   | size              |
| (bounds)   | size,low          |
| low        | [empty]           |
| size       | emptiness         |
| emptiness  | [empty]           |
| ⋮          | ⋮                 | view table 33

Fig.3

```
234~arr = array[int]
236~remove_dupls = proc(a:arr)
    238~a_low: int := arr$low (a)
    240~i: int := a_low
    242~j: int := a_low
    244~s: intset := intset$create ()
    246~while i <= arr$high (a) do
        248~e: int := a[i]
        250~if~intset$member (s,e) then
            252~intset$insert (s,e)
            254~a[j] := e
            255~j:= j + 1
        256~end
        258~i:=i + 1
    260~end
    262~arr$trim (a, a_low,j - a_low)
264~end remove_dupls
```

*Fig. 4a*

```
66~% @ flow a.contents,a.size<—a.contents
    68~% @ a.low <= a.low
    70~% @ a.emptiness <— a.emptiness
```

*Fig. 4b*

Dependency Table

| | 46a | 49a | 48a |
|---|---|---|---|
| 38 | a.contents | | a.contents |
| 40 | a.size | | a.contents |
| 42 | a.emptiness | | a.emptiness |
| | | | |

*Fig.5a*

Equality Table

| | 46b | 49b | 48b |
|---|---|---|---|
| 44 | a.low | | a.low |
| 47 | a.size | | a.size |
| 51 | a.contents | | a.contents |
| 53 | a.emptiness | | a.emptiness |
| | | | |

*Fig.5b*

```
intset = cluster is new,insert,member
     % @ view mutable
     % @    intset ⇒ Contents
     % @    Contents → Size
     % @    Size 102 ~% @ abstraction
  103 ~% @    Contents << contents
  105 ~% @    Size << contents rep = array[int]
     ...
104 ~insert = proc (s: intset, e: int)
  106 ~% @ flow
     % @    s.Contents * ← s.Contents,e
  108 ~% @ repflow
     % @    s.contents ← s.contents,e
     % @    s.size ← s.size
     % @    s.emptiness ← #
     array[int]$addh (down(s),e)
     end insert
     ...
     end intset
```

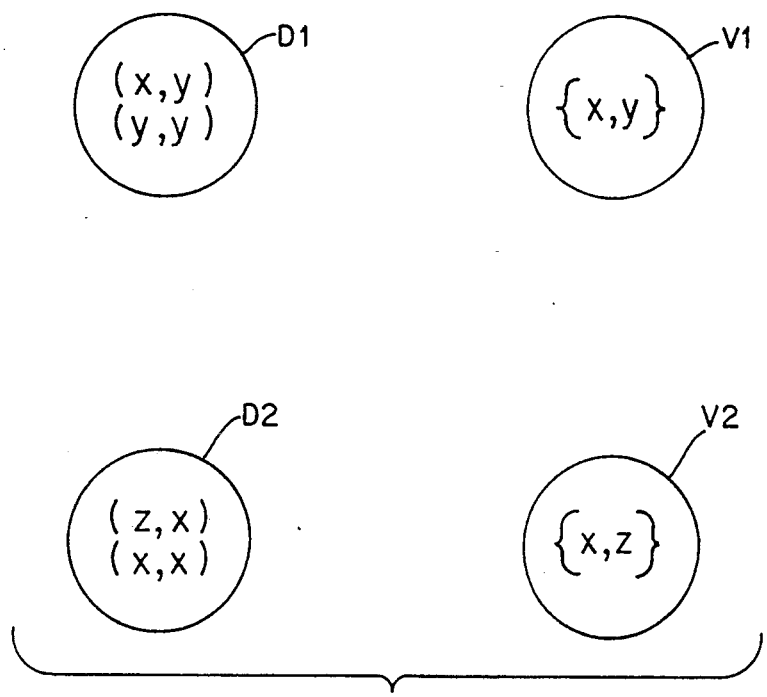
*Fig. 8a*
*Fig. 8b*
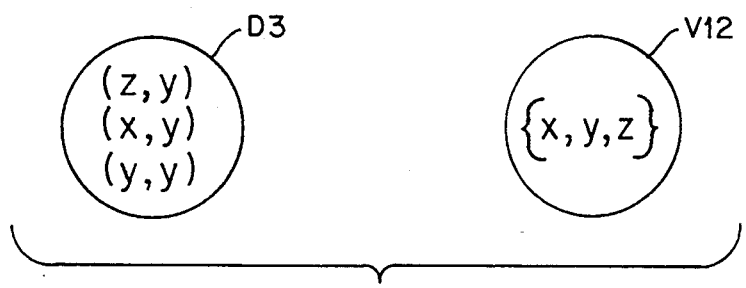
*Fig. 9*

TOOL FOR ERROR DETECTION IN SOFTWARE USING ASPECT SPECIFICATION

GOVERNMENT INTEREST

This invention was made with government support under Contract Number N00014-89-J-1988 awarded by the Department of the Navy and under Grant Number CCR-8910848 awarded by the National Science Foundation. The government has certain rights in the invention.

FIELD OF THE INVENTION

This invention relates generally to software development strategies and more particularly to tools for aiding in error detection of software.

DESCRIPTION OF THE PRIOR ART

With the increasing sophistication of software development strategies, programmers have demanded strategies that aid in locating errors and in verifying the correctness of software designs. A number of different tools of this kind have been developed that vary greatly in their respective approaches. A commonly used tool is type checking. Type checking involves checking code to see if statements employed in the code are consistent with type definitions. For instance, suppose that a section of code includes a statement assigning a variable "i" to have the value of a second variable "a". The type checker checks to see whether the variables "i" and "a" are of the same type or are of at least compatible types. Hence, if "i" is defined as an integer and "a" is defined as a character, the type checker indicates that there is an error at the assignment statement.

Type checking constitutes a crude but effective tool for detecting errors in software. A primary benefit of type checking is that it uncovers a large number of errors. It is even more attractive because it is cost effective, fast and easily implemented. The major disadvantage of type checking lies in its lack of expressiveness, that is, it is very limited in the scope of errors that it catches. Type checking merely checks for consistency of type definitions in the code, and thus, it does not catch many common errors.

At the other end of the spectrum of error detecting approaches is formal verification. The formal verification approach attempts to apply rigorous mathematical techniques to verify the correctness of a program. Such approaches are typically realized through the use of specialized formal verification languages. In accordance with the formal verification approach, programs are constructed in a clearly specified and logically correct manner, or the formal verifications are used to check the correctness of a program after the program has already been written. The formal verification approach provides an error detecting tool that is very expressive and very logically rigorous. Hence, code developed using this tool is correct to a high degree of certainty.

Unfortunately, the formal verification approach suffers from a number of drawbacks. A major drawback is that the formal verification approach is very difficult to use and, therefore, programmers have been hesitant to use it. As such, the formal verification approach is very expressive (i.e., it can be used to detect a broad range of errors) but is significantly more difficult to implement than type checking. A second drawback to formal verification approaches is that it is often very difficult to specify what a program does in a formal specification language. The formal verification approach requires the development of the equivalent of rigorous mathematical proofs and accordingly, can be extremely difficult to implement. Lastly, checking of a program against its specification cannot be automated because the computational complexity renders the approach computationally impractical.

It is, therefore, an object of the present invention to provide a debugging tool that is easily implemented and catches a broad scope of errors.

SUMMARY OF THE INVENTION

The foregoing object is realized by a data processing system for identifying errors in a program having objects. The data processing system includes a storage means such as a memory for holding a subject program that is to be analyzed for software errors such as "bugs". The storage means also holds an analysis program referred to as the checker program. The analysis program analyzes the subject program to identify missing dependencies in the code of the subject program and, thus, identifies errors in the subject program. The checker program is run by a processing means within the data processing system. This processing means may be either a single processor or a plurality of processors.

The approach of the present invention for identifying errors is tractable (i.e., may be automated) while still catching a high number of errors within the subject program. As such, the present invention is significantly less difficult to implement than formal specification approaches while still being more powerful than type checking approaches. In accordance with the approach of the present invention, the program is embellished with specifications that specify dependencies among abstract components of objects of the subject program. These specifications typically take the form of lines added into the code by a programmer or by the checker program. Each object of the subject program has a number of abstract components known as "aspects". For example, a record has a separate aspect for each of its fields. Additional examples of aspects will be discussed below.

Two kinds of specifications are provided. A first kind of specification identifies aspects of object types and specifies relationships between the aspects. A second kind of specification specifies data flow dependencies between the aspects of objects that are referenced within procedures of the program.

The aspects of object types and the relationships between aspects may be specified by either the programmer of the subject program or by the programmer of the checker program. Preferably, the aspects and the relationship between aspects are specified by a programmer of the subject program for programmer defined object types. However, for pre-defined object types, the checker program may automatically embellish the subject program with special lines of specifications that specify the abstract components and relationships between abstract components.

Based on the specifications provided by the programmer or the checker program, the data processing system generates a data flow representation of dependencies of aspects for objects referenced within each procedure. The data processing system also generates a second data flow representation which is created from the code of each procedure which specify the abstract components or aspects that are referenced with the procedure. As such, the first data flow representation is created from the specifications that are embellished to the program, whereas the second data flow representation is created from the code of the program. When the first and second data representations have been generated, the data processing system compares the first data flow representation of a procedure with the second data flow representation to locate any dependencies missing in the second data flow representation. Each omission of such a dependency corresponds to an error in the program. This entire process is preferably performed statically before the program is run.

BRIEF DESCRIPTION OF THE DRAWINGS

FIG. 3 is a depiction of the view table for the array object type.

FIG. 4a, is a code listing of an illustrative procedure,

FIG. 4b is a flow specification for the procedure of FIG. 4a.

FIG. 5a is an example of a dependency table for the remove_dupls procedure set forth in FIG. 4a.

FIG. 5b is an example of an equality table for the remove_dupls procedure set forth in FIG. 4a.

FIGS. 8a and 8b illustrate how flows are formed for the product flow.

FIG. 9 is an illustrative section of code for the trim procedure, which includes a flow specification.

DETAILED DESCRIPTION OF THE PREFERRED EMBODIMENT

Overview

Figures 1, 2:
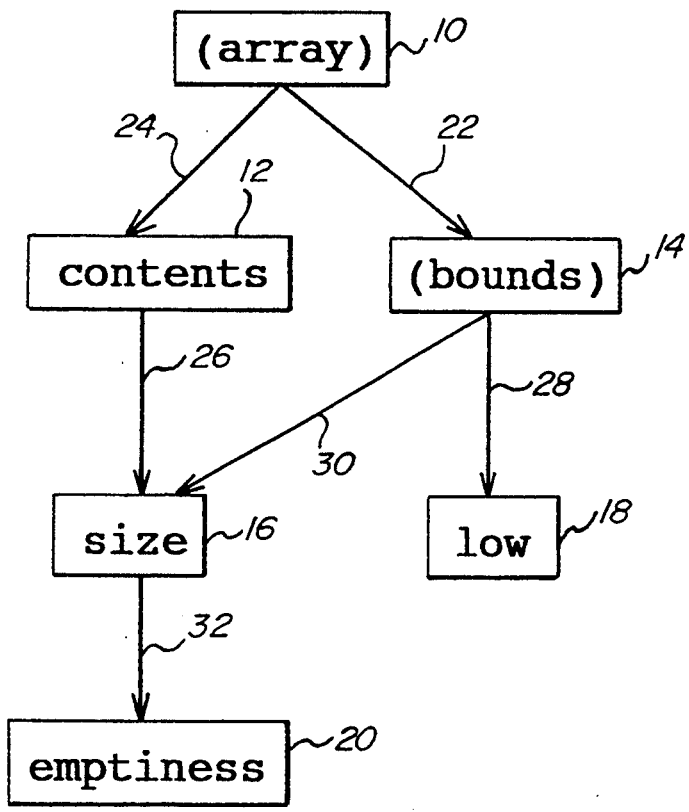
FIG. 1 if is an acyclic graph of an aspect view.
FIG. 2 is a sample view specification for an array object type.

The present invention concerns an approach for detecting errors in the code of a subject program. Like type checking and anomaly analysis, the present technique primarily catches careless errors, but, in addition, it also catches errors of considerably broader scope than those caught by type checking.

The invention may be implemented using a data processing system 150 which includes a storage means such as a memory 152 which holds a subject program that is to be analyzed. The memory 152 also holds the program used to implement the approach of the present invention for detecting errors. This program is run by a processing means 154, connected to the memory 152, which may be either a single processor or a plurality of processors. The present technique relies in part on providing specifications within the subject program. Previously, formal specifications have been used to verify the correctness of software programs (as discussed above), but these previous techniques have been hard to implement, and verification with these techniques has not been susceptible to automation. The present invention's specifications are less powerful than formal specification (i.e., they identify a smaller range of errors than formal specification) but are more easily implemented. The approach of the present invention cannot be used to verify all the properties of a program, but the present invention does provide the capability of finding a variety of errors in a program by checking the program against its specification.

In accordance with an approach of the present invention a specification is provided for procedures in the program. Such a procedure specification gives dependencies that are required to hold true between the final values (i.e., those values after execution of the procedure) of aspects of objects referenced within the procedure to the initial value of aspects of arguments (i.e., objects) passed to or used by the procedure. The checker program examines the code of the procedure body that has been written to perform the procedure and constructs an approximation of the actual dependencies of the code. The approximation is then compared to the specification. If a dependency that is required by the specification is missing in the approximation, there is an error. For example, suppose the programmer specifies that some result is supposed to be computed using certain information and codes the program as such, but the checker program determines that there is no path through the program code in which the information was used. In such a case, the checker flags an error in the program to identify the absence of a path.

The present invention's novel form of dependency analysis is more accurate than existing methods. Instead of dependencies between variables, it considers dependencies between aspects of objects. An array, for example, might have a size aspect and a content aspect. The specification of a procedure that removes duplicates from the array may include a statement that the size of the array after execution of the procedure should depend on the contents of the array before the procedure.

These specifications serve a role other than serving as yardsticks against which implementations are measured. Specifically, the specifications are used in the construction of dependencies. These specifications may set forth dependencies that are not apparent from the code alone. For instance, the programmer might know that some path through the called procedure's code cannot occur. As a result, the specification provides a better approximation of the real dependencies than the code provides. As a further example, consider that the present invention allows the programmer to specify that some object type is immutable. This immutability indicates that an argument of the specified object type cannot change during the course of execution of a procedure and, thus, can only depend on itself. Without such a specification, the checker program would not be able to easily discern this immutability from examining the code. Nevertheless, when the specifications are omitted, the code may be used to construct dependencies, or, alternatively, an approximate specification of the dependencies can be generated by the checker program.

Against the background of the above overview, the details of the present invention will now be described. Central to the present invention is the concept of an "aspect". The notion of an aspect is perhaps best explained by examining a detailed example. Hence, the discussion that immediately follows focuses on an array object type and the corresponding aspects for the array.

Aspect View

An array object type includes the aspects of its contents, its size and its lower bound (low). These aspects correspond to the intuitive notion of the abstract components of an array. An "aspect view" is a set of aspects and an ordering for such aspects. One useful representation of an aspect view is an acyclic graph like that depicted in FIG. 1.

The graph of FIG. 1 is hierarchically organized. At the root 10 of the graph is an aspect specifying the name of the object type. In this instance, the root aspect bears the object type name, "array". Situated beneath the root 10 are the aspects of the object type. These aspects are interconnected to the root 10 via directed edges which designate relationships between the aspects. Specifically, the aspect from which each directed edge originates includes the aspect to which the directed edge points. Hence, "array" 10 includes "contents" 12 (pointed to by directed edge 24) and "bounds" 14 (pointed to by directed edge 22).

These aspects may be further decomposed into their included aspects. Specifically, "contents" 12 may be decomposed into the "size" aspect 16 (which is included in "contents" as indicated by directed edge 26). This relationship seems intuitive because one typically views the contents of an array as including the size of the array. Similarly, "bounds" 14 may be decomposed into "size" 16 and "low" bound 18 (as indicated by directed edges 30 and 28, respectively). Lastly, "size" 16 may be decomposed into "emptiness" 20, as indicated by directed edge 32.

The aspects may be of two different types: real aspects or pseudo-aspects. Real aspects are actual components of the object type, such as "contents" in the above-described example. Pseudo-aspects, in contrast, refer to superfluous aspects of the object type which serve merely as shorthand notations for real aspects. Pseudo-aspects are designated by parentheses as depicted in FIG. 1. For instance, "bounds" is a shorthand notation for "size" 16 and "low" bounds 18. The "array" aspect 10 and the "bounds" 14 aspect are additional examples of such pseudo-aspects. The pseudo-aspects are employed primarily for notational convenience.

The aspect view does not include any extraneous or redundant information. For instance, the pseudo-aspect "bounds" 14 does not include both the aspect of "high" bound and the aspect of "low" bound. Rather, it only includes the "low" bound aspect 18 and the "size" aspect 16.

The aspects of an object type may be viewed as mappings from the object type. For instance, for the aspects of the "array" object type, the "size" aspect 16 and the "low" aspect 18 may be viewed as functions that map from arrays to integers (i.e., they map from the array object type to the integer values of "size" and "low" bound, respectively). Similarly, the "emptiness" aspect 20 may be viewed as relation that maps arrays to booleans, and the "contents" aspect 12 may be viewed as a relation that maps from arrays to sequences (i.e., to the contents of the array). From this perspective, each directed edge of the aspect view constitutes a derivation. Given this interpretation of a directed edge, FIG. 1 makes clear that "emptiness" 20 is derivable from "size" 16, which, in turn, is derivable from "contents" 12.

The notion of an aspect is employed in the present invention to help locate errors in a program. In accordance with the present invention, a programmer may annotate his code with lines of aspect specifications, or, alternatively, the checker program may add lines of aspect specifications to the code. The program, embellished by the aspect specifications, is then processed by the checker program. The checker program reviews the program in light of the aspect specifications and produces output which identifies errors in the program.

The aspect specifications are of two types. The first type of aspect specification is an aspect "view specification", which is provided for each type of object in a program to be processed. This aspect view specification is, as described above, a set of aspects and an ordering for the set of aspects. The second type of aspect specification is a "flow specification", which is provided for each procedure in the program. The flow specification sets forth a set of dependencies which relate the arguments of a procedure with the results of the procedure. These two types of aspect specifications are discussed separately in more detail below.

Aspect View Specifications

The aspect view specification for each object type is set forth in lines of annotations provided in the code at the object type definition. For pre-defined object types, the checker provides the new specification of the aspect view, whereas for programmer defined object types, the programmer of the subject program provides the view specification. An example of a view specification for the array object type is given in FIG. 2. The annotated lines are designated by "%@" before the line. The "%@" tells the compiler not to compile code for these lines. These lines are parsed and analyzed by the checker program prior to compiling. Nevertheless, the checker program may be part of the compiler.

As can be seen in that example view specification of FIG. 2, each view specification (denoted as "view-spec") begins with the reserved word "view". The reserved word view is followed by a "kind" field which indicates the kind of aspect view that is being specified. The "kind" field may have a value of "immutable" or "mutable". As mentioned above, an argument of an immutable object type cannot change during execution of a procedure, but an argument of a mutable object type can change. For the example view specification provided in FIG. 2, the kind field has a "mutable" value. Following the kind field in the view specification are the parameters of the aspect view ("params") which are set out between brackets. For the "array" object type view specification of FIG. 2, the parameter "t" is set forth in brackets after the "mutable" kind field. The role of parameters such as "t" will be discussed in more detail below. Lastly, the view specification includes a set of aspect declarations ("aspect-decl").

Each aspect declaration is comprised of an "aspect-namer" followed by either an "image" or a "graft". The aspect-namer is the name of a particular aspect. Thus, for the aspect view of FIG. 2, "contents" is an example of an aspect-namer. An image is a projection operator (denoted as "proj-op") followed by at least one aspect-namer. The projection operators include the operators "→" and "=>" which are both used in the example view specification of FIG. 2. These operators imply particular relationships between aspects which will be discussed below. A graft is a "/" followed by a parameter ("param"). No graft is provided in the example view specification of FIG. 2. Nevertheless, grafts will also be discussed in more detail below.

The first aspect declaration 131 for the view specification of FIG. 2 is "array => contents, bounds". This aspect declaration 131 for "array" includes the projection operator "=>" followed by the aspect-namers "contents" and "bounds" which are separated by a comma. The projection operator "=>" specifies, a "comprises" relationship. This aspect declaration 131 indicates that array is a pseudo-aspect comprising the aspects "contents" and "bounds". The aspect declaration 132 for "contents" however, employs the "→" projection operator which specifies an "includes" relationship. This projection operator implies that "contents" includes the aspect of "size". The difference between the "comprises" relationship and the "includes" relationship rests with whether the aspect to the left of the projection operator is a pseudo-aspect or a real aspect. The aspect view specification also includes aspect declarations 133, 134,135 and 136 for "bounds", "size", "low" and "emptiness", respectively. This view specification of FIG. 2 is a shorthand notation for the acyclic graph of FIG. 1.

The syntax for the aspect view specification may be expressed more formally as follows:

| | |
|---|---|
| view-spec | ::= view kind [params] {aspect-decl} |
| kind | ::= immutable \| mutable |
| params | ::= [ param {, param}] |
| aspect-decl | ::= aspect-namer [images \| graft] |
| images | ::= proj-op aspect-namer {, aspect-namer} |
| proj-op | ::= → \| => |
| graft | ::= / param |

The aspect views may be stored in memory as tables. In particular, each dependency specified in an aspect view may be stored as a separate row in an aspect view table. FIG. 3 provides an illustration of how such a table may be organized. In particular, the table is divided into two columns, 30 and 32 which each hold certain aspects. The aspects in column 32 depend upon the corresponding aspects in column 30. Hence, as illustrated by the entries in row 34 in FIG. 3, the aspects of "contents" and "bounds" depend upon the aspect of "array". This table includes entries holding pseudo-aspects. As a practical matter, these entries would likely not be included because such pseudo-aspects may be expressed as the real aspects that they include. The tables provide a readily accessible and conveniently organized means for storing this information. The use of such tables will be explained in more detail below.

Flow Specification

In addition to providing an aspect view specification of each object type, the programmer provides a flow specification for the procedures to be examined by the checker. As mentioned above, a flow specification sets forth a set of dependencies which relate the arguments of a procedure (i.e., the initial values of aspects of objects passed to or referenced by the procedure) with the results of the procedure (i.e., the values of the aspects of objects referenced within the procedure after execution of the procedure). An example flow specification is depicted in FIG. 4b. This flow specification is provided for the "remove_dupls" procedure that is set forth in FIG. 4a.

Before discussing the flow specification in more detail, it is helpful to first examine the procedure shown in FIG 4a. This procedure is set forth in the programming language CLU. CLU has a number of conventions that need to be set forth in order to understand the code shown in FIG. 4a. Specifically, CLU facilitates the notion of a cluster, which is a set of procedures that implement an object type. "intset" is an example of a cluster name. It is, as its name implies, an integer set. In a procedure call, the cluster name is separated by a dollar sign "$" from the procedure name. Hence, in line 44 of the code of FIG. 4a "intset$create" indicates a procedure call to the create procedure of the cluster "intset". The create procedure creates an initial empty version of "intset".

Line 34 of the code depicted in FIG. 4a is a type declaration that indicates that the type "arr" is an array object type which has an integer index. The procedure body for the "remove_dupls" procedure begins at line 36. Line 36 makes clear that "remove_dupls" is a procedure that is passed a parameter "a" of type "arr". Line 38 declares that the variable "a_low" is of type integer and equals the value returned by the "low" procedure. (The "low" procedure will be described in more detail below).

The variables "i" and "j" are declared as integers (i.e., "i:int" and "j:int") and are initialized to have a value equal to "a_low" by lines 40 and 42, respectively. At line 44, the variable "s" is defined as being of the cluster type "intset". This cluster is created by a call to the "create" procedure.

The "remove_dupls" procedure includes a loop body that begins with a while statement at line 46 of the procedure. The "while" loop continues to execute while the variable "i" is less than the high bound of the array "a" (see "i <=art$high(a)"). While the condition tested in line 46 remains true, the variable "e" is declared as an integer and given a value equal to the contents of the array at the "ith" position of the array "a" (line 48). In line 50, the program checks whether "e" is not a member of the set "s". Since "e" has a value of "a[i]", this call to the "member" procedure determines whether "a[i]" is not within the set "s". If "e" is not within the set "s", it is inserted into "s" at line 52. The "jth" position of the array is then set to have a value equal to "e" in line 54. "j" is then incremented by 1 in line 55. The end of the "if" statement is indicated by line 56.

At line 58, "i" is incremented by 1 and, at line 60, an "end" statement designates the end of the while loop. Line 62 invokes a call to the "trim" procedure which removes all the elements in array "a" other than the j—a_low elements beginning at the index "a_low". Lastly, at line 64, an end statement is provided to denote the end of the "remove_dupls" procedure.

The above described procedure serves to remove duplicate elements from the array. Each element array is examined, in turn, by incrementing the index "i". The other index "j" points to the end of the array prefix that is guaranteed free of duplicates. The set "s" contains the elements of the segment of duplicate free elements. In contrast, the segment between the indexes "j" and "i" contain only duplicates which are trimmed off the array by the "trim" procedure when "i" reaches the high bound.

FIG. 4b shows the flow specification for the "remove_dupls" procedure. Each flow specification ("flow-spec") may include an abstract flow portion and/or a concrete flow portion. A concrete flow comprises the reserved word "flow" (see FIG. 4b) followed by a set of flows; while an abstract flow comprises the reserved word "repflow" followed by a set of flows. The flow specification of FIG. 4b is a concrete flow because it employs the reserved word "flow" at line 66. The significance of the difference between an abstract-flow and a concrete flow lies in the type of flow being specified, as will be explained below.

Each set of flows comprises a sequence of flow clauses. Any flow clauses set out before the reserved word "normal" are those flow clauses that are common to all kinds of termination of the data flow denoted as "always-flow". Following the term "normal:" in such a flow specification are flow clauses for a normal mode of operation (denoted as "normal-flow"). Lastly, following the normal flow clauses in such a flow specification are the exceptional cases (i.e. signals) which are denoted as "signal-flow". The syntax for the signal-flows is the reserved word "when" followed by a signal name, which is separated by a colon from the flow clause. In other words, when the signal specified by the signal name is present the flow clause set forth after the colon is appropriate. The flow specification of FIG. 4b does not include the use of the reserved word "normal" because it always follows only one path (i.e., the "always-flow" path).

Each flow clause serves to relate an aspect to another aspect or to relate the empty list to a particular aspect. Line 68 provides an example of a flow clause. It relates "a.low" to "a.low". Each flow-clause includes an aspect (e.g., "a.low") followed by a flow operator (e.g., "<="). The flow operator may be followed by additional aspects (e.g., "a.low") or by the symbol "#", which indicates an empty list.

The flow operators which may be used in a flow-clause include "←" (see line 66), "*←" (see line 68), "<=" and "<#". The flow operator "←" indicates that one aspect depends on another. In particular, the aspect to the left of this symbol depends on the aspect to the right of the symbol. Thus, "a.contents, a.size <=a.contents" implies that the values of both "a.contents" and "a.size" after the procedure is executed depend on the value of "a.contents" before the procedure is executed. The flow operator "*←" indicates that the aspect to the left and all its successors depend on the aspects to the right. The notion of successors is perhaps best understood by looking at an acylic graph representing an aspect view. Successors of an aspect are all those aspects in the aspect view which are at levels of the graph below the aspect and which have a path leading to them from the aspect. Hence, in FIG. 1, "size" and "emptiness" are successors of "contents", but "low" is not a successor because there is no path leading to it from "contents".

The flow operator "<=" indicates that each successor of the aspects on the left depend on the corresponding successor of the aspects on the right. Further, this operator indicates that the aspects on the left and the aspects on the right are equal. Thus, in FIG. 4b, "a.low <=a.low" indicates the successors of "a.low" after execution depend on the value of "a.low" before execution and are equal. Lastly, the operation "<#" indicates that each successor of the aspects on the left of the operator depend on the corresponding successor of the aspects on the right. There is, however, "equal" relationship, as is specified by the "<=" operator.

In the flow specification, the aspects are referenced by a variable followed by an aspect path. The variable may be an identifier, a result or a signal-result. The objects to be returned by procedures or to be yielded by iterators are specified with the reserved word "result". As indicated in the above syntax specification, the result is the reserved word "result" which may be followed by an "!" and a digit. The and digit are used to identify the results when there are several returned or yielded results. Similarly, the signal-result refers to a signal-name which may be followed by "!" and a digit if multiple signal names are used.

The aspect path is specified by an aspect-namer which may be followed by a "." and a next aspect-namer. In particular, the aspect of an argument is specified as "argument .aspect". Hence, to refer to the contents aspect for an array, identified by a variable "a", one uses "a.contents" in the flow specification.

The syntax for the flow specifications may be expressed more formally as follows:

| | | |
|---|---|---|
| flow-spec | ::= | [abstract-flow] [concrete-flow] |
| abstract-flow | ::= | flow flows |
| concrete-flow | ::= | repflow flows |
| flows | ::= | [always-flow] normal: normal-flow {signal-flow} |
| always-flow | ::= | {flow-clause} |
| normal-flow | ::= | {flow-clause} |
| signal-flow | ::= | when signal-names: {flow-clause} |
| flow-clause | ::= | aspects flow-op (aspects \| #) |
| signal-names | ::= | signal-name {, signal-name} |
| aspects | ::= | aspect {, aspect} |
| flow-op | ::= | ← \| *← <= \| <# |
| aspect | ::= | variable [aspect-path] |
| aspect-path | ::= | aspect-namer {, aspect-namer} |
| variable | ::= | identifier \| result \| signal-result |
| result | ::= | result [! digit] |
| signal-result | ::= | signal-name [! digit] |
| signal-name | ::= | identifier |

The flow specifications, like the view specifications, are held in memory as tables. Separate tables are maintained for storing dependency relationships and for storing equality relationships. FIG. 5a provides an example dependency table 49a for the "remove_dupls" procedure shown in FIG. 4a, and FIG. 5b provides an example of the corresponding equality table 49a. Each entry in table 49a specifies a dependency. The entries in both of the tables may be divided into two columns 46a, 46b and 48a, 48b. In table 49a, the columns designate the respective dependencies. The elements in column 46a depend upon the elements in column 48a. From line 66 (FIG. 4b) of the flow specification for the "remove_dupls" procedure, it is made clear that "a.contents" and "a.size" depend on "a.contents". Accordingly, entries 38 and 40 are made in dependency table 49a to establish this dependency relationship. In addition, the dependency relationship of line 70 (FIG. 4b) is recorded by entry 42 (FIG. 5a) noting that "a.emptiness" is dependent on "a.emptiness".

In contrast, the equality table 49b designates equality relationships. In particular, the entries in column 46b are equal to the entries in 48b. Thus, for example, line 68 (FIG. 4b) "a.low" in the flow specification procedure specifies that the value of "a.low" after the execution of the "remove_dupls" procedure is equal to the value of "a .low" before execution of this procedure. There is an equality relationship established; hence, at line 44 (FIG. 5b) of table 49b, the entries in column 46b and in column 48b are both "a.low". Furthermore, entries 47, 51, and 53 designate equality relationships for the remaining real aspects for the array "a" (see FIG. 1).

What is stored in these tables 49a and 49b (FIGS. 5a and 5b) for any given flow clause depends upon the flow operator employed. If the "←" operator is included in the flow clause, there is a straight dependency relationship, and there is no expansion of the left or right side of the flow clause in the table (i.e., no additional entries are made in the flow table based upon the single flow clause of the flow specification). However, since the operator "<=" specifies an equality relationship between the aspects on opposite sides of the flow operator, it causes expansion of the aspects on both sides of the operator. In instances where the "<=" operator is employed, the relationships between the successors are also entered into the flow table by the checker program.

If the operator "<#" is used as opposed to "<=", there is an implication that there is a dependency between the aspects on the respective sides of this operator and their respective successors, but it is not an equality relationship. The "*←" operator also brings about expansion so that additional entries are made into a flow table. The expansion, however, is only for the aspects on the lefthand side of the operator. This operator implies that the aspect on the lefthand side of the operator and all of its successors depend on the aspect on the righthand side of the operator.

Figures 6, 7:
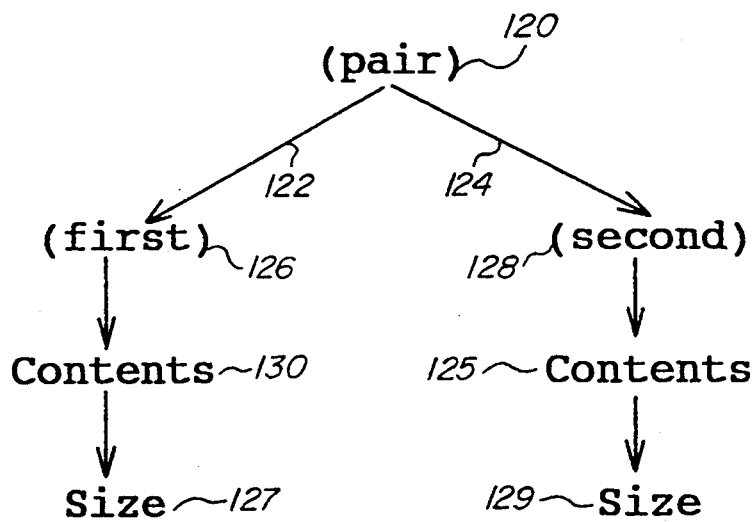
FIG. 6 is an illustrative listing of code and a flow specification for the code.
FIG. 7 is a diagram illustrating the handling of parameterized object types in the present invention.
Figure 10:
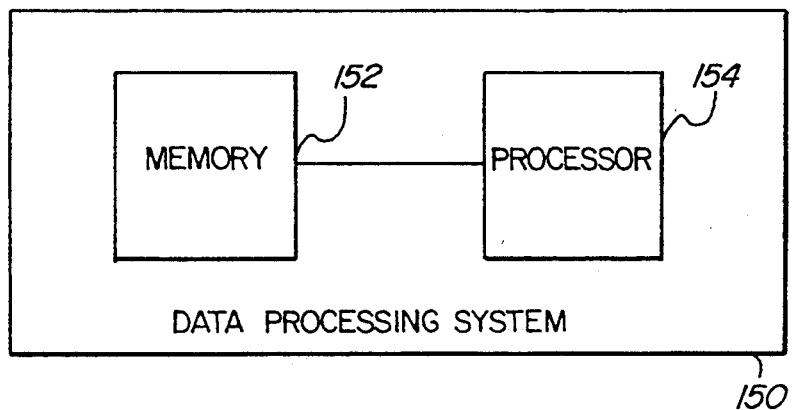
FIG. 10 is a block diagram of a data processing system suitable for implementation of the present invention.

This discussion should make evident the kind of expansion that occurs in the creation of flow tables like those depicted in FIGS. 5 and 6. In order to perform such expansion, however, the checker program must utilize the view tables like that depicted in FIG. 3. Specifically, the system uses the view tables to determine the successors of respective aspects for a given object type. Hence, for the example of FIG. 5a and 5b, the system knows that "a" is an array object type. It, thus, looks up the view specification for the array object type. By accessing a view table such as view table 33 in FIG. 3, the system is able to determine the successors of each of the respective aspects. It accordingly expands the view specifications provided by the programmer in his code to quantify all of the dependency and equality relationships.

Additional Features

Programmer-defined object types are implemented with the assistance of non-programmer-defined object types called "reps". The reps act as surrogates that facilitate imitation of the abstract object types. An example of an abstract object type is provided in FIG. 6 for the "intset" (mnemonic for integer set) type discussed briefly above. This abstract type may be implemented as a number of different standard types including an array, a hash table or a binary tree. If one of these standard types is used to implement the "intset" type, it serves in a "rep" capacity.

Each procedure exported by an object type may have two aspect specifications: one for the abstract type (which is denoted by the reserved word "flow") and one for the rep type (which is denoted by the reserved word "repflow"). The "insert" procedure which begins at line 104 is a good example of such an exported procedure. It includes an aspect flow specification beginning with "flow" (line 106) and one beginning with "repflow" (line 108). The aspect specification for the abstract type is used when the procedure is called nonlocally, whereas the aspect specification of the rep type is used in checking local code. In deriving flows from the procedures code, the checker, as will be described in more detail below, treats the abstract objects as rep objects. Moreover, if a procedure from the same cluster is called, the checker uses the rep specification.

The abstract specification is checked against the rep specification with the help of an abstraction function (see lines 102, 103 and 105). The abstraction function relates the aspects of the abstract view to aspects of the rep type's aspect view. The abstraction function is given by listing the rep aspects from which a non-pseudo abstract aspect may be derived, for each non-pseudo abstract aspect. An example of such an abstraction function is provided in FIG. 6. The reserve word "Abstraction" is provided in the specification shown in FIG. 6. Beneath the reserve word "Abstraction" at line 102 are statements at lines 103 and 105 indicating the relation of aspects of the abstract types aspect view to aspects of the rep types aspect view. The example in FIG. 6 assumes that the rep type is the "array" object type (see line 107). The statement at line 103, "Contents < <contents", indicates that the contents of the array object type are related to the contents of the "intset" type. Similarly, at line 105, the "Size < <contents" statement indicates that the size of the "intset" object type is derived from the contents of the array object type.

An example is the "insert" procedure provided in FIG. 6, which exports the abstract object type "intset". This procedure is provided with two aspect specifications (i.e., one for the abstract type beginning with the reserve word "flow" at line 106 and one for the rep type beginning with the reserve word "repflow" beginning at line 108). As mentioned above, the checker checks the abstract flow against the rep flow, and, in this instance, each abstract aspect of the variable "s" of type intset is replaced by the rep aspect from which it is derived from.

The CLU programming language allows parameterization of types. The present invention provides the capability to handle such parameterization through the use of the "/" graft operator. As an example, suppose that there is a mutable object type "pair[t]" that is defined with an operation for reading and updating two components of an arbitrary type "t". The two components are labeled "first" and "second", respectively. The checker program is able to instantiantiate "pair[t]" by binding the parameter "t" to the type of the element objects. In the specification, however, this type is unknown. In order to address this problem, an aspect view specification like the following is provided.

view mutable[t ]
    pair—→ first, second
    first/t
    second/t

This graft operator grafts the view of a type parameter to a lowest level entry of the view of the parameterized type. In particular the view of "pair[t]" has two aspects, one for each component of the pair (i.e., one for "first" and one for "second").

This view serves as a template for building views for instantiantiations of the type. To generate a view for this specification, the checker generates a view as shown in FIG. 7. In the view, there are separate branches 122 and 124 for "first" 126 and "second" 128. Each of these branches has a respective version of "Contents" 130, 134 and "Size" 132, 136. These branches are distinguished by forming a path name that includes the grafting aspect. As such, a pair[p] has aspect "p", "p.first", "p.second", "p.first.Contents", "p.first.Size", "p.second.Contents", and "p.second.Size".

The present invention is designed to be incremental in that the user may choose to omit part of a flow specification. When portions of the specification are omitted, the portions of the specification that are provided are still checked. However, if part of a flow is not specified, spurious errors may be reported. Hence, the checker warns the user when a dependency aspect is unspecified. The hash symbol "#" may be used to record the intentional omission of a dependency in a specification so as to suppress a warning message.

When a procedure is called that has no specification or that is incomplete, the checker generates the most conservative specification it can. In this generated specification, roughly every aspect of the post-state (after procedure execution) depends on every aspect of the pre-state (before procedure execution). This insures that no bogus errors are reported. In addition the checker may be implemented so that it generates an even better specification that catches more bugs by taking into account the mutability of arguments. Arguments of an immutable object type are invariant and, thus, may depend only on themselves. The checker may automatically insert equality clauses with immutable arguments so as to spare the user need to record them. This also insures that the specifications never include unrecognizable claims to modify immutable aspects.

Checker

When the aspect view specification and the flow specification are completed, a programmer passes the entire annotated program or only a portion of the program through the checker to check for errors. The checker generates both error messages and warning messages. The error messages indicate faults in the aspect specification text. These may be lexical errors, syntax errors or violations of consistency checks. Warning messages indicate faults in the aspect specification text such as the failure to include all the aspects of results objects and in flow specification. Conjecture messages, on the other hand, note discrepancies between the code and the aspect specification. The conjecture messages serve to identify the missing dependency and to indicate procedure wherein the error is found.

Figure 11:
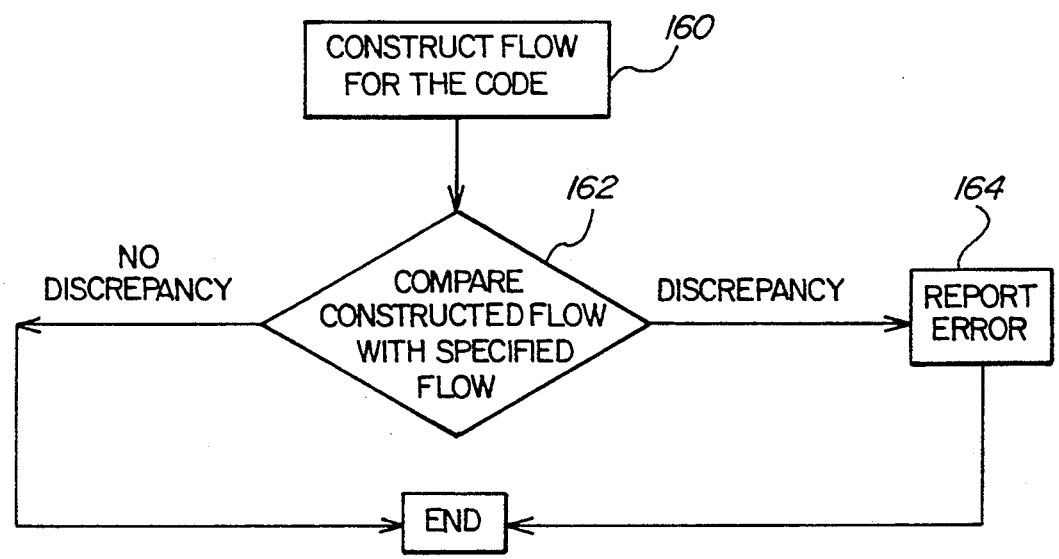

The checker locates errors by the method described in FIG. 11 by initially constructing a flow for the code in step 160 and comparing the constructed flow with the specified flow is step 162. The checker reports an error in step 164 if the constructed flow does not correspond to the flow specification. The checker constructs flows for the code utilizing a number of rules. In particular, a rule is provided for each possible type of statement construction. Several examples are helpful in illustrating of how flows are constructed for different types of statements in the code. As the first example, assume that a section of code contains two assignment statements:

X:=Y

Z:=X

For each of these statements, a flow relationship may be formulated. In particular, from the first statement a dependence of X from the value of Y and a dependence of Y upon the value of Y, (since Y is unchanged within the statement) may be formulated. From the second statement, there are, likewise, two dependency relationships which are derived. First, Z depends upon X, and second, X depends upon X since it is unchanged within the statement. The checker combines the aspect dependencies from the statements within a section of code. Hence, in this example, the system combines the dependencies on the two statements to yield three dependencies. The first dependency is that Z is dependent on Y. The second and third combined dependencies are that X is dependent on Y and that Y is dependent on Y, because it does not change in either of the statements.

Such a combination of dependencies can be expressed more formally as follows. Let f1 be the flow (D1,V) with dependencies D1 and variables V and let f2 be the flow (D2,V). The flows refer to the set of dependencies for the respective statements. The combined dependencies or the product of the two flows equal:

$$f2*f1 = (\{(a,c) \mid \exists\, b. (a,b) \in D2\ \&\ (b,c) \in D1\},\ V)$$

This equation implies that the product of the dependencies is a flow comprised of dependencies and variables. The variables of the product are V, as they were in the flows f1 and f2. The dependencies, however, have changed as noted between the brackets in the above equation. In particular, the dependencies are all dependencies (a,c) that is, a is dependent on c, wherein there exists a and b such that the dependency (a,b) is an element of the set of dependencies D2, and there also exists a dependency (b,c) that is an element of the set of dependencies D1. This equation assumes that the variable sets are the same. However, if they are not the same, they must be extended to match. For each variable that is added to a flow, the dependencies of all of that variable s aspects on themselves are added.

An example is helpful in illustrating this formal expression of the product of the flow. FIG. 8a gives the dependencies D1 and the variables V1 for the first assignment statement example given above. FIG. 8a also shows the dependencies D2 and the variables V2 for the second assignment statement in the example above. From the depictions in FIG. 8a, one can see how the resulting product flows (shown in FIG. 8b as dependencies D3 and variables set V12) are obtained. In particular, each of the dependencies in D3 meets the criterion of the above equation. For example, the dependency (z,y) meets the criterion set forth in the equation (i.e., substitute "z" for the value of "a" in the equation and substitute "y" for the value of "c" in the equation). Furthermore, "b" assumes the value of "x". Thus, there exists an "x" such that the dependency (z,x) is an element of the dependency set D2, and such that the dependency (x,y) is an element of the dependency set D1. Accordingly, the dependency (z,y) is an element of the product dependency set D3. Similar analysis can be followed for the dependencies (x,y) and (y,y) to determine that the above equation is fulfilled.

Forks

The above example considers only the instance wherein an assignment statement is provided. However, the code may contain many other varieties of statements. For instance, the code may include an "if" statement. The general approach to constructing a flow for an "if" statement is to form a composite flow that corresponds to the flows for each of the branches of the conditional statement. As a result, the dependencies are just the union of the dependencies of the two flows for the branches. More formally, for a two branch conditional statement, the formation of a composite flow can be expressed as:

$$f2+f1 = (D2 \cup D1, V)$$

where f1 and f2 are the flows for the respective branches and D1 and D2 are the dependencies for the respective branches and V equals the variables of the statement.

This approach to constructing flows for "if" statements does not adequately account for all varieties of "if" statements. Take into consideration the following fragment of code:

x:=y
if b then z:=x return end
z:=1

If b is true at the test within the "if" statement, the fragment terminates at the return statement, and "z" depends on "y". However, if "b" is false, "z" is set to 1 and depends on nothing. In composing this program fragment with whatever follows, the two flows must be kept separate. Only the normal flow is combined with the flow of the succeeding fragment, whereas the return flow is unaffected by what follows.

In order to compensate for such varieties of statements, the checker composes forks rather than flows when these statements appear. A fork is a set of flows indexed by a kind of termination. Thus, a fork F may have a normal flow $F_{normal}$, a return flow $F_{return}$, and a flow for any other kind of termination such as a signal, a break or an exit. The products and sums of forks can be expressed in terms of their flows. For example, the product F21 of two forks F2 and F1, this product F21 is comprised of a normal fork $F21_{normal}$ and a return fork $F21_{return}$. The normal flow $F21_{normal}$ is composed from the normal flow for each statement; hence, $$(F2**F1)_{normal} = F2_{normal} * F1_{normal}$$

where * is the product as described above for the flows F2 normal and F1 normal.

The return flow, however, has two parts since the program may return either by returning from the first statement or by passing normally through the first statement and returning from the second statement. As such, the composite return flow is expressed as follows:

$$F2**F1)_{return} = (F2_{return} * F1_{normal}) + F1_{return}$$

The sum of two forks is merely the sum of the constituent flows. For instance, the return flow of the sum of a first fork F1 and a second fork F2 is expressed as:

$$F2++F1_{return} = F2_{return} + F1_{return}$$

The formal construction rules for forks are as follows. The fork of a sequence of two fragments of code S1 and S2 is the product of the forks and the fragments. As such, the fork of the sequence of the two fragments is equal to:

FS2**FS1

Further, the fork of an if statement is the sum of the forks of the branches. Accordingly, given an "if" statement of the form if b then S1 else S2, the fork of this statement is:

FS2++FS1

If, however, the condition checked in the "if" statement is procedure call B, additional dependencies have to be included. In this instance, the fork for the "if" statement is equal to:

(FS2++FS1)** FB

The form of the construction-rule for the "if" statement matches the possible paths through the program in reverse. In particular, the execution of the "if" statement comprises a procedure call B followed by the first fragment S1 or the procedure call B followed by the second fragment S2. This perspective is helpful in constructing rule for awhile statements. In particular, consider the "while" loop:

while B do S

The possible paths in this statement are the procedure call B or a procedure call B followed by the fragment S or the procedure call B followed by the fragment S followed again by the procedure call B, and so on. As such, the fork construction rule is:

FB++(FSFB)++(FBFS**FB)...

The remaining rules for constructing flows from statements are straightforward and may be equivalently described in terms of data flow graphs according to known approaches like those described in Jeanne Ferrante, "The Program Dependence Graph And Its Use In Optimization," *ACM Trans. Programming Languages And Systems*, Vol. 9, No. 3, July 1987; Andy Podgurski & Lori A. Clarke, "A Formal Model Of Program Dependencies And Its Implications For Software Testing, Debugging & Maintenance," *IEEE Trans Software Eng.*, Vol. 1, No. 9, September 1990; and Mark Moriconi, "Approximate Reasoning About The Semantic Effect Of Program Change," *IEEE Trans. Software Eng.*, Vol. 1, No. 9, September 1990. It should be noted that approach described above employing "forks" will not work when "go to" statements are employed. Data flow graphs must be employed in such an instance.

The forks for an assignment statement are generally as described above. For instance, for the assignment statement X:=Y the dependencies are that Y depends on Y, and that X depends on Y. This is the rule for a simple assignment statement.

Once the checker program has constructed a code flow, it compares the code flow with the flow specification. In particular, the checker checks to see whether each dependency within the flow specification is met by code flow. If the code fails to account for all the dependencies, the code is missing a dependency and an error message is generated.

Consider, as an example, a faulty variant of the code shown in FIG. 4a. As was discussed above, the "remove_dupls" procedure serves to remove duplicate elements within an array. As is evident from the flow specification provided in FIG. 4b, the value of the aspect "a.size" after execution of the procedure depends upon the content (i.e., "a.content") before execution of the procedure. This is intuitively obvious because the size of the array after execution of the procedure is dependent upon the contents of the array prior to execution. The difference between the array after and before execution is merely that the duplicates have been removed.

Suppose, however, that in the call of the trim procedure at line 62, the "j" variable in the third augument of the procedure call is replaced by the variable "i". The checker program will be able to locate such an error in the code at line 62. To explain how the program is able to locate such an error it is helpful first to discuss the "trim" procedure in more detail along with its flow specification because the "trim" procedure is called within the body of the "remove_dupls" procedure. Hence, activities of the "trim" procedure may affect the array "a". FIG. 9 shows the parameters of the "trim" procedure (see line 140 in FIG. 9) and shows the flow specification for the trim procedure at lines 142, 144 and 146. Line 144 of the flow specification for "trim" makes clear that the size of the array "a" depends exclusively on its size before execution of the procedure (i.e., "a.- bounds") and on the second and third parameters passed to the procedure (i.e., "lo" and "ct"). The values of the last two parameters "lo" and "ct" respectively designate the low index value and the number of elements from the low index value that are to remain in the array "a" after execution of the trim procedure.

Line 144 (see FIG. 9) of the flow specification for the "trim" procedure tells us that the size of the array after execution of the "trim" procedure depends on the size before execution (i.e., "a.bounds") and on the parameters "lo" and "ct". Hence, for this dependency to hold true in the code, the parameters "lo" and "ct", which are passed to the "trim" procedure must depend upon the size of the array before execution (i.e., they must depend on "a.size"). In the correct code instance, this requirement is met because the value of the parameter "ct" (FIG. 9) depends on the value of the variable "j" (because "trim" is passed "j—a_low" as the "ct" parameter in the call to "trim" within the body of "remove_dupls" (line 62 in FIG. 4a)), and "j" depends upon the size of the array "a" before execution of the procedure. Specifically, the value of "j" at line 62 is equal to the number of non-duplicative elements in the array "a". However, in a faulty variant wherein the variable "j" is replaced with "i", there is no longer this dependency. Rather, the parameter "ct" in the call to the "trim" procedure at line 62 is passed a value of "i—a low" and thus, depends solely on the variable "i" and the variable "a_low". Neither of these variables depend upon the size of the array "a" before execution. "lo" is the low index value for the array, and "i" is the high index value of the array "a". Both "i" and "a_low" depend upon the bounds of the array before execution, but they do not depend upon the size of the array before execution. As such, the dependency will not exist in this faulty variant and the missing dependency will be identified by the checker program.

In addition to determining whether all the dependencies are provided within the code, the checker also does consistency checks on the view specifications and on the flow specifications. With regard to the view specification, the checker checks several properties. First, it checks to see whether an aspect name appears on the righthand side of a declaration which previously has appeared on the lefthand side of a view specification. Second, it checks to see whether there are the same number of view parameters as there are cluster-type parameters. Third, it checks to see that each root bears the name of a cluster and also checks to see that the root is not a graft point. Fourth, it looks at every aspect-namer used on the righthand side of a view declaration and ascertains whether it later appears in exactly one view declaration on the lefthand side. Fifth, the checker looks at each aspect-namer to make certain that it is reachable from the root by following projection operators.

The checker also checks consistency properties for the flow specifications. First, in particular, it checks that proper variable names are used. Second, it checks to see that each aspect name belongs to the view of the type of the variable to which it is appended. Third, it checks to see that the result and signal variables only occur on the lefthand side of each flow cause. Fourth, it generates a warning if an aspect occurs more than once on the lefthand side of flow clauses of a flow specification. Fifth, it checks to see that aspects of arguments that are immutable do not occur on the lefthand side of the flow cause, and sixth, it checks to see that aspects equated by a flow cause are view matched. In other words, it checks to see that the two aspects have the same aspect-namer and belong to the same view, or it checks to see if the graft aspect is bound to a view whose root aspect is named by the other.

While the present invention has been shown with respect to preferred embodiments thereof, those skilled in the art will know of other alternative embodiments which do not depart from the spirit and scope of the invention as defined in the appended claims.

I claim:

1. In a data processing system, a method for identifying errors in code of a program having objects and specifications that specify dependencies among abstract components of objects of the program, the method comprising the steps, performed by the data processing system of:
   a) analyzing the code in the program to determine dependencies in the code among abstract components of objects of the program;
   b) comparing the dependencies specified by the specifications with the dependencies which were determined by the analyzing step to locate any missing dependencies that are specified by the specifications but lacking in the code; and
   c) identifying errors associated with the missing dependencies.

2. A method as recited in claim 1 further comprising the step of receiving the specifications from a programmer of the program.

3. A method as recited in claim 1 further comprising the step of automatically providing the specifications.

4. A method as recited in claim 1 wherein a programmer of the program provides the specifications for objects which the programmer defines, and the method further comprises the step of automatically providing the specifications for pre-defined objects.

5. A method as recited in claim 1 further comprising the step of verifying correctness of specifications.

6. A method as recited in claims 1 wherein the step of identifying errors in the program is performed before the program is run.

7. In a data processing system, a method for identifying errors in a program, said program including code which defines procedures and object type definitions, wherein an object type has an abstract component and a relationship between any multiple abstract components and a dependency between abstract components of object types referenced within procedures of the program, the method comprising the steps, performed by the data processing system, of:
   a) generating, for each procedure, a first data flow representation of the abstract components referenced by the procedure, based on the specified dependencies, by processing the program in the data processing system;

b) generating, for each procedure, a second data flow representation of the abstract components referenced by the procedure, according to the code defining the procedure;

c) comparing the first data flow representation with the second data flow representation, for each procedure, to locate any dependencies missing in said second data flow representation; and d) identifying errors for each missing dependency found in the step of comparing.

8. A method as recited in claim 7 wherein a user of the program specifies abstract components of data types and the method further comprising the step of receiving the specified abstract components.

9. A method as recited in claim 7 further comprising the step of automatically specifying abstract components of data object types.

10. A method as recited in claim 7 wherein the step of identifying errors is performed before the program is run.

11. A data processing system for identifying errors in a program having object specifications that specify dependencies among abstract components of objects of the program, the data processing system comprising:

a) means for analyzing code in the program to identify dependencies in the code among abstract components of objects defined in the program;

b) means for comparing the dependencies specified by the specifications to dependencies identified in the code to identify missing dependencies; and c) means for identifying errors associated with the missing dependencies.

12. A data processing system for identifying errors in a program comprising:

a) a storage means for storing:

i) a subject program to be analyzed by the data processing system to identify any errors in the subject program, said subject program including dependency information for abstract components of objects referenced within the program;

ii) an analysis program for analyzing the subject program to identify dependencies in the subject program, said analysis program identifying any dependencies specified by the dependency information which are lacking in the subject program; and b) a processing means for running the analysis program to analyze the subject program in order to identify missing dependencies specified by the dependency information and missing in the subject program which missing dependencies identify errors in the subject program.

13. A data processing system as recited in claim 12 wherein said storage means is a memory.

14. A data processing system for identifying errors in a program comprising:

a memory in which the program is stored, the program including dependency information for abstract components of objects referenced within the program;

a processor connected to the memory and including:

means for accessing the memory to read the program; and means for analyzing the program to identify dependencies in the program, and for comparing the identified dependencies to dependencies specified by the dependency information, to identify dependencies missing in the program, wherein the errors in the program are associated with the identified missing dependencies.

15. The data processing system of claim 14, further comprising a means for verifying correctness of the specified dependencies.

* * * * *